United States Patent [19]

Adelman et al.

[11] Patent Number: 5,440,946

[45] Date of Patent: Aug. 15, 1995

[54] MOTION TRANSMITTING REMOTE CONTROL ASSEMBLY WITH ADJUSTABLE BACKLASH

[75] Inventors: Frank F. Adelman, Bensalem; Joseph Sosnowski, Norristown; Rodney L. Alderfer, Harleysville, all of Pa.

[73] Assignee: Teleflex Incorporated, Limerick, Pa.

[21] Appl. No.: 141,129

[22] Filed: Oct. 22, 1993

[51] Int. Cl.⁶ ............................................. F16C 1/28
[52] U.S. Cl. ................... 74/502.3; 74/500.5; 74/501.5 R; 74/502
[58] Field of Search ................. 74/502.3, 502.5, 500.5, 74/501.5 R, 501.5 H, 502, 503

[56] References Cited

U.S. PATENT DOCUMENTS

| | | |
|---|---|---|
| 3,438,280 | 4/1969 | McCabe . |
| 3,552,218 | 1/1971 | Gregory ............................. 74/502.3 |
| 3,841,171 | 10/1974 | Young, Jr. ......................... 74/502.3 |
| 4,378,712 | 4/1983 | Yoshifuji ........................... 74/502.5 |
| 5,105,678 | 4/1992 | Adelman et al. . |

Primary Examiner—Charles A. Marmor
Assistant Examiner—Peter Kwon
Attorney, Agent, or Firm—Howard & Howard

[57] ABSTRACT

A flexible motion transmitting remote control assembly (10) for high load force transmission over long distance includes a motion transmitting core element (20) slidably disposed within a tubular casing (12). A roller assembly (24) along with upper (32) and lower (32') races position the core element (20) within the casing (12) for minimizing sliding friction. The upper (32) and lower (32') races each have a shoulder (42') at one end for retaining that end of the race in a fixed position within the casing (12). The opposite end of the upper (32) and lower (32') races are each provided with a post (52, 52') which protrude through respective axially extending slots (66, 66') in the casing (12). As the casing (12) is routed during installation to form curved sections between its two ends, the respective posts (52, 52') on the upper (32) and lower (32') races are displaced axially within their slots (66, 66') through the casing (12). Respective clamps (58, 60) then lock the posts (52, 52') against further movement relative to the casing (12). A turnbuckle sleeve (90) is rotated to change the length of the casing (12) between the two locked ends of the upper (32) and lower (32') races for accurately setting the backlash.

22 Claims, 2 Drawing Sheets

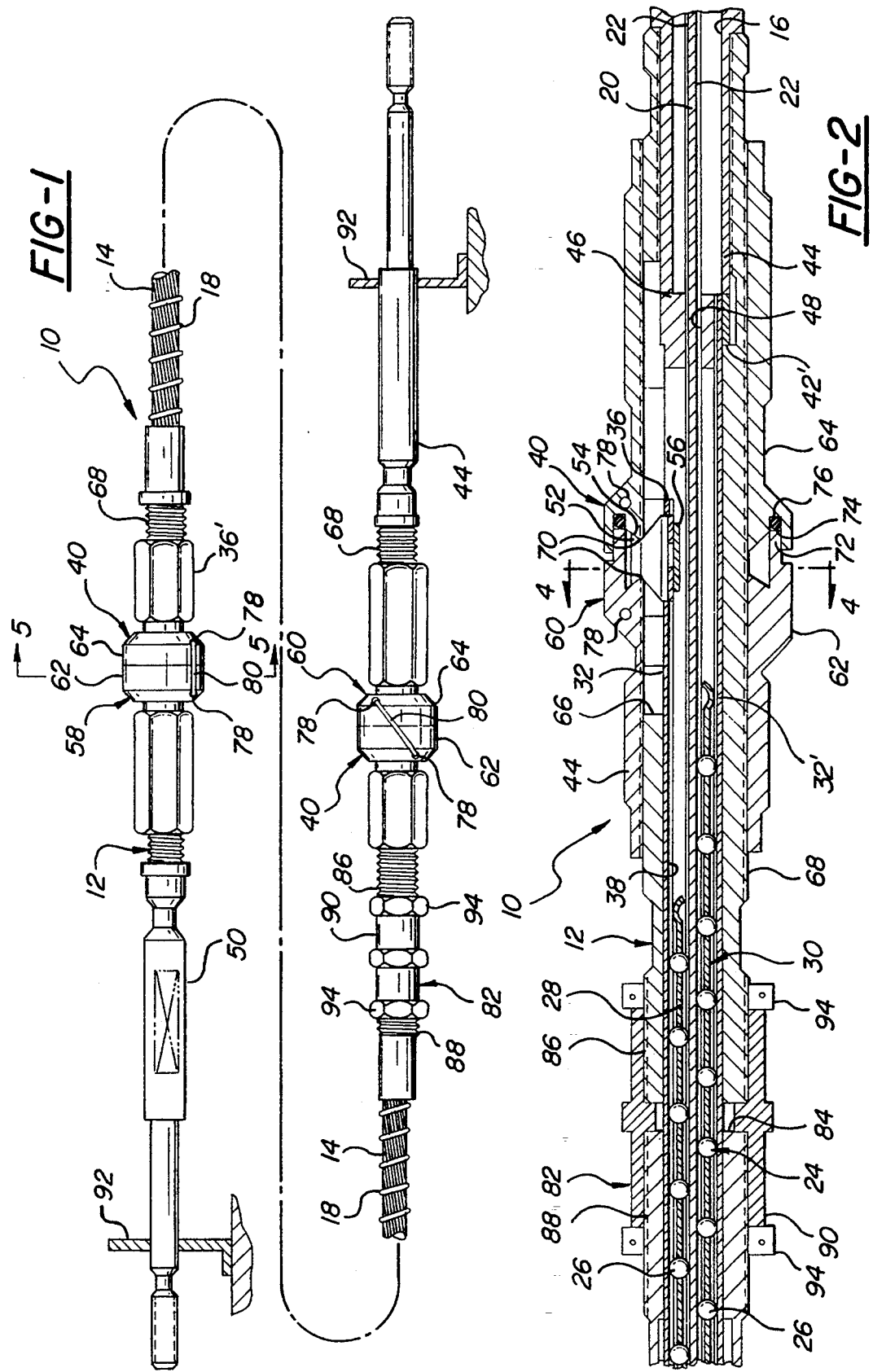

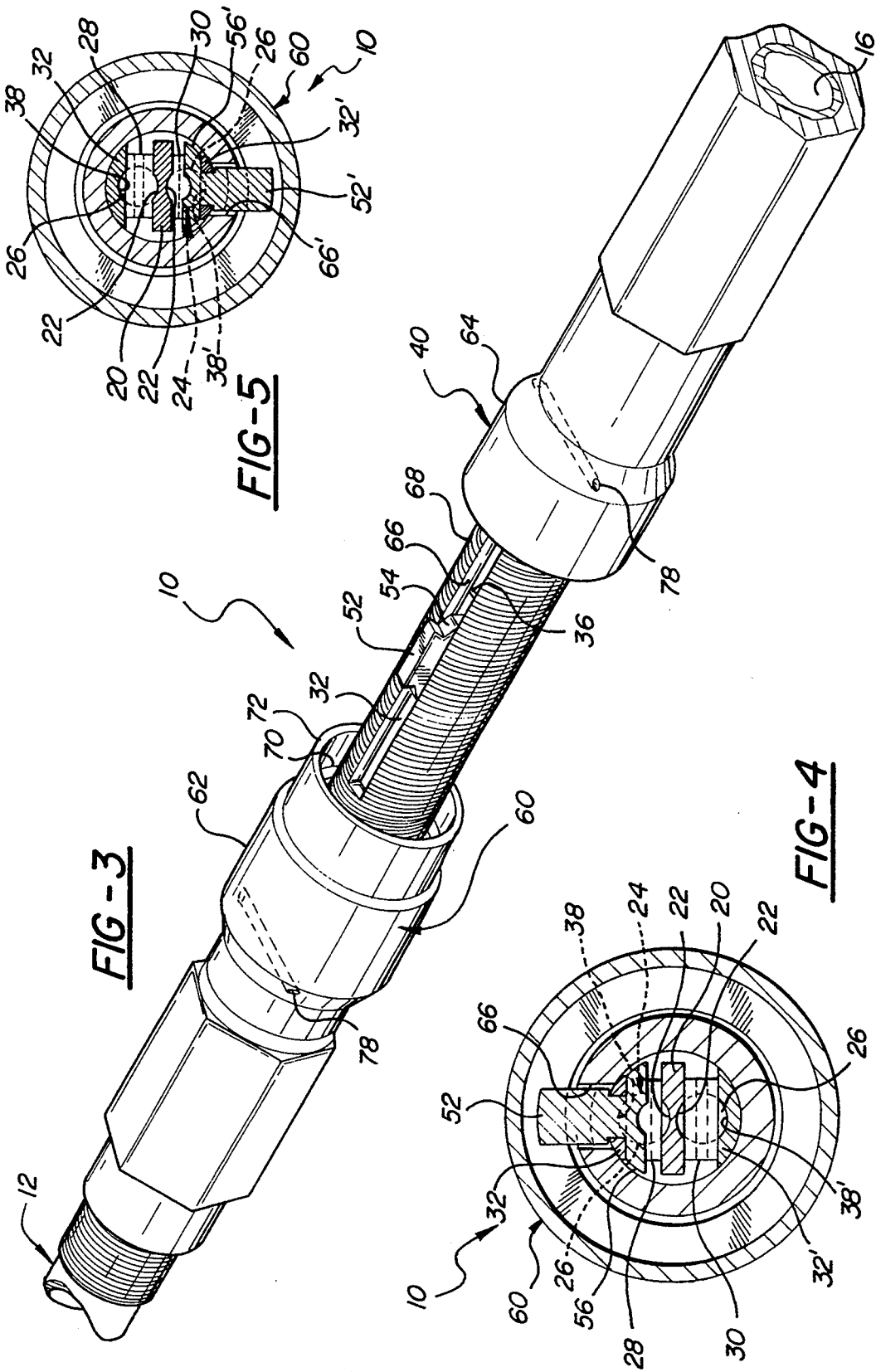

MOTION TRANSMITTING REMOTE CONTROL ASSEMBLY WITH ADJUSTABLE BACKLASH

TECHNICAL FIELD

The subject assembly relates to motion transmitting remote control assemblies of the type for transmitting motion in a curved path by a flexible motion transmitting core element slidably supported in a casing, and more particularly to such an assembly wherein the core element is slidably supported in the casing by a roller assembly.

BACKGROUND OF THE INVENTION

Motion transmitting remote control assemblies are typically employed to control a device by transmitting tension or compression in a curved path by means of a flexible core element. Remote control assemblies of this type include a casing surrounding a motion transmitting core element which is moved back and forth in the casing to remotely control or position an element to which the core element is attached. Exemplary applications to which the instant invention pertains includes high performance military aircraft component control such as primary flight controls and jet engine throttle control. Accordingly, it will be appreciated that during active operation the remote control assembly is required to transmit high load forces over long distances, and such must be accomplished with minimal core element backlash. Backlash, more particularly, is the lack of responsiveness in a remote control assembly resulting from a loose fit (typically an excessive running clearance) between the core element and its casing or, in the case of the instant invention, between the core element and the roller assembly. This lack of responsiveness causes an excessive amount of input motion on the core element before output motion is realized. In critical applications, such as high performance military aircraft, the lack of responsiveness resulting from excessive backlash is highly undesired.

U.S. Pat. No. 3,438,280 to McCabe, issued Apr. 15, 1969 and assigned to the assignee of the subject invention, discloses a remote control assembly of the type described above. In this example, the casing is fabricated by winding a plurality of long lay wires in helical turns and encasing them in plastic to form an inner passage through which the core element is positioned. Casings fabricated after this construction can have a significant drawback which is clearly recognized by McCabe. That drawback is that the plastic encasing the inner lay wires is not sufficient to restrain the lay wires from unwinding during high loading on the core element, such high loading as frequently occurs in high performance military aircraft. The McCabe reference recognized that the casing is not capable of restraining the side loads of the core element during high load applications, and accordingly constructed two races on opposite sides of the core element to act as tension carrying members. This was accomplished by locking, or restraining, both ends of the races relative to the casing. It will be readily appreciated by those skilled in the art that one or both of the races must be moveable during installation to retain flexibility of the casing and allow the casing to be routed through curved sections between its ends. Therefore, locking of the races occurs after installation is complete.

However, the McCabe construction proved, over time, to still be inadequate to restrain backlash because under high loading conditions, the fixed races would still impart side loads against the rather weak casing, which in turn flexed and bulged in isolated sections to result in increased backlash.

Therefore, over the years, the industry has developed more sophisticated constructions which do not rely upon the races for resisting side loading of the core element. As a result, structurally stable casings have been constructed which do not deform under high loading conditions. These flexible casings are formed by at least one inner lay wire wounded in helical turns at a predetermined pitch to form a tubular inner passage, and at least one outer support wire wound in helical turns tightly about the exterior of the inner lay wire at a pitch different than the predetermined pitch of the inner lay wire to restrain deformation of the inner lay wire from slide loads applied against the inner passage by the core element. Thus, because the casings are now of sufficiently sound construction to resist all foreseeable side loading, even during operation of high performance military aircraft, the races inside the casing are left preputially moveable within the casing, i.e., unlocked, to preserve the flexibility of the casing. That is, there is presently perceived no need to lock the races relative to the casing because the casing itself is sufficiently strong enough to resist all foreseeable side loading by the core element. An example of a typical prior art remote control assembly having an improved casing construction is shown in U.S. Pat. No. 5,105,678 to Adelman et al, issued Apr. 21, 1992 and assigned to the assignee of the subject invention.

Thus, the prior art has progressed to a state where additional backlash is not introduced into the system as a result of high loading applied during operation. However, the inherent backlash resulting from the running clearance between the roller assemblies and the core element still results in a certain amount of backlash which the prior art is not capable of reducing or eliminating.

SUMMARY OF THE INVENTION AND ADVANTAGES

The subject invention contemplates a flexible motion transmitting remote control assembly for high load transmission over long distance with minimal backlash. The assembly comprises a flexible casing having at least one lay wire wound with helical turns at a predetermined pitch to form a tubular inner passage and at least one outer support wire wound in helical turns tightly about the exterior of the inner lay wire at a pitch different than the predetermined pitch to restrain deformation of the inner lay wire from side loads applied against the inner passage. A core element is slidably disposed within the inner passage of the casing and capable of imparting side loads against the inner lay wire as the core element slides through curved sections of the casing. A roller assembly is disposed in the inner passage on opposing sides of the core element for reducing sliding friction of the core element. An upper race has first and second ends and is disposed on one side of the core element between the roller means and the inner lay wire. A lower race having first and second ends is disposed on another side of the core element between the roller means and the inner lay wire. The improvement of the subject invention comprises a backlash adjustor means for accurately setting the backlash between the core element and the upper and lower races by changing the length of the casing at a position between the ends of the upper and lower races while the retaining each of the ends fixed relative to the casing.

The subject invention uniquely combines the present state of the art technology in casings capable of resisting all foreseeable side loads applied to it by the core element, as well as the very old technique of locking both ends of the upper and lower races relative to the casing only used before present casing technology was developed. The subject invention combines these features with the backlash adjustor means which changes the length of the casing at a position between the fixed ends of the races so that the backlash between the core element and the upper and lower races can be accurately set. As the amount of backlash in any remote control assembly is inversely related to the load required to overcome friction within the assembly, the backlash adjustor means allows a remote control assembly to be individually adjusted after installation to a level of optimum performance where the backlash reduction is balanced against the increase in core element sliding friction.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of the control assembly;

FIG. 2 is a fragmentary cross-sectional view showing the second clamp assembly and the backlash adjustor means;

FIG. 3 is a fragmentary perspective view of the right clamp halve disposed for operation over the casing with the upper post slidably disposed in its slot;

FIG. 4 is a cross-sectional view taken along lines 4—4 of FIG. 2; and

FIG. 5 is a cross-sectional view taken along lines 5—5 of FIG. 1.

DETAILED DESCRIPTION OF THE PREFERRED EMBODIMENT

Referring to the Figures, wherein like numerals indicate like or corresponding parts throughout the several views, a motion transmitting remote control assembly is generally shown at 10. Preferably, the remote control assembly 10 is of the type for high performance military aircraft applications and the like where high load forces must be transmitted over long distances with minimal backlash.

The assembly 10 includes a flexible casing, generally indicated at 12, having at least one inner lay wire 14 wound in helical turns at a predetermined pitch to form a tubular inner passage 16. Preferably, the casing 12 includes a plurality of inner lay wires 14 arranged in side-by-side non-overlapping fashion, with all the inner lay wires 14 being wound in helical turns at the same predetermined pitch. The casing 12 also includes at least one outer support wire 18 wound in helical turns about the exterior of the inner lay wires 14 at a pitch different than the predetermined pitch of the inner lay wires 14. The outer support wire 18 functions to restrain deformation of the inner lay wires 14 from side loads applied against the inner passage 16. In the preferred embodiment, the helical turns of the inner lay wires 14 are directed oppositely relative to the helical turns of the outer support wire 18. In this manner, slide loading applied against the inner lay wires 14 which urge the inner lay wires 14 to unwind but are restrained by the oppositely wound outer support wire 18 which is simultaneously urged to unwind in the opposite direction. Also, it is preferred that the helical pitch of the outer support wire be greater than the helical pitch of the inner lay wires 14. Thus, if the inner lay wires 14 are wound at a pitch of 10°-20°, the outer support wire 18 would be wound in the opposite direction at a helical pitch of greater than 20°. In other words, the inner lay wires 14 preferably have a much higher lead than the outer support wire 18.

A core element 20 is slidably disposed within the inner passage 16 of the casing 12 and is capable of imparting side loads against the inner lay wires 14 as the core element 12 slides through curved sections of the casing 12. In other words, as the core element 20 is forcibly slid through curved routed sections of the casing 12, restraining forces are applied by the casing 12 against the core element 20 to redirect the line of force along the length of the core element 20. Thus, compressive loads transmitted along the core element 20 are restrained by the casing 12 on the outside of a curved section, whereas tensile loads transmitted along the core element 20 are restrained by the casing 12 along the inside of a curve.

Preferably, the core element 20 has a generally rectangular cross section along its length. However, for reasons described below, the core element 20 includes a semi-circular groove 22 extending lengthwise along its upper and lower sides.

A roller means, generally indicated at 24, is disposed in the inner passage 16 on opposing sides of the core element 20 for reducing sliding friction of the core element 20 within the casing 12. The roller means 24 is of the well known type including a plurality of spherical rollers 26 retained in both an upper cage 28 and a lower cage 30. The spherical rollers 26 seat within the respective grooves 22 in the core element 20.

An upper race 32 is disposed in casing 12 and extends between first (not shown) and second 36 ends corresponding with left and right ends of the casing 12 as viewed from FIG. 1. The upper race 32 is positioned on the upper side of the core element 20 between the roller means 24 and the inner lay wires 14 for providing a rolling surface against which the spherical rollers 26 in the upper cage 28 are permitted to run. In substantially identical fashion, a lower race 32' has first (not shown) and second 36' ends and is positioned on the lower side of the core element 20 between the roller means 24 and the inner lay wires 14. Thus, the lower race 32' forms a rolling surface against which the spherical rollers 26 in the lower cage 30 run. Each of the upper 32 and lower 32' races have a rounded outer surface conforming in shape to the inner passage 16 against which they abut, and an opposite flat roller surface. The flat roller surface of each of the upper 32 and lower 32' races includes a guide groove 38, 38' respectively, for the spherical rollers 26.

A lock means, generally indicated at 40, it provided for fixedly retaining each of the ends 34, 34', 36, 36' of the upper 32 and lower 32' races relative to the casing 12. The lock means 40 is a component of the backlash adjustor means 82, described in detail below, and has two separate constructions, one for fixing one end of each race 32, 32' at all times, and another configuration for locking the other end of the races 32, 32' only after the remote control assembly 10 has been fully routed, i.e., after installation.

The configuration of the lock means 40 which permanently attaches one end of the upper 32 and lower 32' races relative to the casing 12 comprises a lower shoe 42' attached to the second end 36' of the lower race 32'. In identical fashion, an upper shoe (not shown) is attached to the first end of the upper race 32. An end fitting extension 44 is threaded into the second end of the casing 12 and sandwiches the lower shoe 42' in an axially fixed position relative to the casing 12. Likewise trapped between the end fitting extension 44 and the second end of the casing 12 is a second stop face 46 positioned directly above the second end 36' of the lower race 32. The stop face 46 prevents radially inward deflection of the second end 36' of the lower race 32' thereby maintaining the lower shoe 42' trapped between the end fitting extension 44 and the second end of the casing 12. The second stop face 46 includes an appropriately shaped core element passage 48 for supporting the core element 20 as it slides therethrough. In an identical fashion to that described above and shown in FIGS. 2, the first end of the upper race 32 includes an upper shoe strapped between an end fitting extension 50 and the first end of the casing 12. A first stop face (not shown) constructed identical to the second stop face 46 is disposed in the casing 12 adjacent the first end of the upper race 32 and has a core element passage therethrough. Thus, the first end of the upper race 32 is restrained against axial movement within the casing 12 by its upper shoe trapped between the end fitting extension 50 and the first end of the casing 12, along with the locked condition of the first stop face, similar to that shown in FIG. 2.

The lock means 40 also includes an upper post 52 attached to the second end 36 of the upper race 32. The upper post 52 has a radial positioning means for preventing radial deflection thereof while fixed relative to the casing 12. The radial positioning means, more particularly, includes a dovetail 54 which is impinged on both sides to prevent radial movement of the second end 36 of the upper race 32, as well as to prevent axial movement of the upper race 32 relative to the casing 12. As shown in FIG. 5, the lower race 32' is provided with an identical post, 52' construction having the radial positioning means in the form of a dovetail, all located at the first end. The posts 52, 52' are attached to the respective ends of the upper and lower races 32, 32' by any manner well known in the art, such as brazing. Also, a small wear plate 56, 56' may be attached to the inside surface of the respective races 32, 32' for reduced abrasion against the core element 20 in the event of contact.

The lock means 40 further includes a first clamp, generally indicated at 58, for engaging opposite sides of the lower post and a second clamp, generally indicated at 60, for engaging opposite sides of the upper post 52. Each of the first 58 and second 60 clamps include left 62 and right 64 clamps halves, respectively, movably carried on the casing 12. The outer surfaces of the clamp halves 62, 64 can be provided with a grip enhancement, such as knurling (not shown) or wrenching flats (FIG. 1). The casing 12 includes a first axially extending slot 66' for receiving the lower post and a second axially extending slot 66 for receiving the upper post 52. The casing 12 has a threaded exterior surface 68 adjacent each of the slots 66. Each of the left 62 and right 64 clamp halves of the first 58 and second 60 clamps includes coacting threads for engaging the respective threaded exterior surfaces 68 so that as the clamp halves 62, 64 are rotated in opposite directions, they move either toward or away from the respective post 52, 52'.

Each of the left 62 and right 64 clamp halves include a frustoconical leading edge 70 for engaging opposite sides of the dovetail 54 of the post 52 to prevent both radial and axial displacement of the post 52 when locked in position. Further, each of the left clamp halves 62 includes an annular tongue 72 and each of the right clamp halves 64 includes an annular groove 74 for receiving the respective tongues 72. The interlocking tongues 72 and grooves 74 form a labyrinth to block the entrance of debris into the inner passage 16. Also, an elastomeric seal, in the form of an O-ring 76, is disposed in the annular groove 74 of each of the right clamp halves 64 for engaging the leading face of the respective tongues 72 to form a moisture barrier.

Therefore, as the remote control assembly 10 is routed during installation, the various bends in the casing 12 will cause the free ends of the upper 32 and lower 32' races to float with their respective post 52, 52' sliding in its slot 66. Once the remote control assembly 10 has been fully routed such that no further movement of the races 32, 32' relative to the casing 12 is required, the first 58 and second 60 clamps are actuated to lock the free ends of the races 32, 32' in place. This is accomplished by rotating the left 62 and right 64 clamp halves in opposite directions toward each other until they bear with equal force against the respective posts 52, 52'. This effectively locks the respective posts 52, 52' relative to the casing 12. To assure clamp halves 62, 64 will not separate during operation, auxiliary tie wire openings 78 are provided through which a tie wire is installed and twisted in the usual manner.

A backlash adjustor means, generally indicated at 82, is provided for accurately setting the backlash between the core element 20 and the upper 32 and lower 32' races. This is accomplished by changing the length of the casing 12 at a position between the respective ends of the upper 32 and lower 32' races while the lock means 40 retains each of the race ends fixed relative to the casing 12. In this manner, the backlash adjustor means 82 uses both the tension carrying ability of the casing 12 and the locked races 32, 32' to adjust the backlash to an optimum limit, it being understood that as backlash is reduced sliding friction on the core element is increased. Thus, there is a tradeoff between reducing the backlash and increasing the core element 20 friction which can be precisely balanced by way of the backlash adjustor means 82.

The backlash adjustor means 82 includes a threaded screw mechanism, as best shown in FIGS. 1 and 2. That is, more particularly, the backlash adjustor means 82 includes a separation 84 in the casing 12 at some location between the first 58 and second 60 clamps. Right hand 86 and left hand 88 threaded sections are disposed on opposite sides of the separation 84. A turnbuckle sleeve 90 bridges the separation 84 and threadably engages each of the right hand 86 and left hand 88 threaded sections.

Once the remote control assembly 10 is installed and the first 58 and second 60 clamps have been fully manipulated to lock the respective posts 52, 52' in place relative to the casing 12, the turnbuckle sleeve 90 is rotated to cause enlargement of the separation 84, thus increasing the length of the casing 12 while the two ends of each of the upper 32 and lower 32' races remain fixed relative to mounting brackets 92. The increasing length of the casing 12 causes the curved sections of the casing 12 to bend more sharply, thus causing the upper 32 and lower 32' races to move toward each other in these curved sections. This, in turn, has the effect of eliminating backlash in the system. Because the casing 12 is of the construction type which can adequately withstand side loading applied by the core element 20 without its lay wires 14 unwinding, this increasing of the casing 12 length by the turnbuckle sleeve 90 does not cause the casing 12 to bulge or enlarge in isolated locations when the races 32, 32' bear with force thereagainst.

Once the backlash has been accurately set, a pair of jam nuts 94 are brought to bear on opposite sides of the turnbuckle sleeve 90 to lock the turnbuckle sleeve 90 in position and thereby prevent inadvertent readjustment of the backlash. For safety, tie wire openings 96 are provided in the jam nuts 94 to receive a tie wire (not shown) in typical fashion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A flexible motion transmitting remote control assembly (10) for high load force transmission over long distance with minimal backlash, said assembly comprising: a flexible casing (12) having at least one inner lay wire (14) wound in helical turns at a predetermined pitch to form a tubular inner passage (16) and at least one outer support wire (18) wound in helical turns tightly about the exterior of said inner lay wire (14) at a pitch different than said predetermined pitch to restrain deformation of said inner lay wire (14) from side loads applied against said inner passage (16); a core element (20) slidably disposed within said inner passage (16) of said casing (12) and capable of imparting side loads against said inner lay wire (14) as said core element (20) slides through curved sections of said casing (12); roller means (24) disposed in said inner passage (16) on opposing sides of said core element (20) for reducing sliding friction of said core element (20); an upper race (32) having first and second ends and disposed on one side of said core element (20) between said roller means (24) and said inner lay wire (14); a lower race (32') having first and second ends and disposed on another side of said core element (20) between said roller means (24) and said inner lay wire (14); and characterized by backlash adjustor means (82) for accurately setting the backlash between said core element (20) and said upper (32) and lower (32') races by changing the length of said casing (12) at a position between said ends of said upper (32) and lower (32') races while retaining each of said ends fixed relative to said casing (12).

2. An assembly as set forth in claim 1 wherein said backlash adjustor means (82) includes lock means for fixedly retaining each of said ends of said upper (32) and lower (32') races relative to said casing (12), said lock means including an upper post (52) attached to said second end (36) of said upper race (32) and a lower post (52') attached to said first end of said lower race (32').

3. An assembly as set forth in claim 2 wherein each of said upper (52) and lower (52') posts include radial positioning means for preventing radial deflection thereof while fixed relative to said casing (12).

4. An assembly as set forth in claim 3 wherein said radial positioning means includes a dovetail (54).

5. An assembly as set forth in claim 3 wherein said lock means (40) includes a first clamp (58) for engaging opposite sides of said lower post and a second clamp (60) for engaging opposite sides of said upper post (52).

6. An assembly as set forth in claim 5 wherein said casing (12) includes a plurality of inner lay wires (14) arranged in side-by-side non-over lapping fashion and all of said inner lay wires (14) being wound in helical turns at said predetermined pitch.

7. An assembly as set forth in claim 6 wherein said helical turns of said inner lay wires (14) are oppositely directed relative to said helical turns of said outer support wire (18).

8. An assembly as set forth in claim 6 wherein said first (58) and second (60) clamps such include left (62) and right (64) clamp halves movably carried on said casing (12).

9. An assembly as set forth in claim 8 wherein said casing (12) includes a first axially extending slot (66') for receiving said lower post (52') and a second axially extending slot (66) for receiving said upper post (52).

10. An assembly as set forth in claim 9 wherein said casing (12) includes a threaded exterior surface (68) adjacent each of said first and second (66) slots, and each of said left (62) and right (64) clamp halves of said first (58) and second (60) clamps including coacting threads for engaging said respective exterior threaded surfaces (68).

11. An assembly as set forth in claim 10 wherein said lock means (40) includes an upper shoe attached to said first end of said upper race (32) and a lower shoe (42') attached to said second end (36) of said lower race (32').

12. An assembly as set forth in claim 11 wherein said backlash adjustor means (82) includes a threaded screw mechanism.

13. An assembly as set forth in claim 12 wherein said backlash adjustor means includes a separation (84) in said casing (12) with right hand (86) and left hand (88) threaded sections disposed on opposite sides of said separation (84), and a turnbuckle sleeve (90) bridging said separation (84) and threadably engaging each of said right hand (86) and left hand (88) threaded sections.

14. An assembly as set forth in claim 13 further including a jam nut (94) threadably disposed on each of said right hand (86) and left hand (88) threaded sections.

15. An assembly as set forth in claim 14 wherein said left clamp halve (62) of each of said first (58) and second (60) clamps includes an annular tongue (72) and said right clamp halve (64) of each of said first (58) and second (60) clamps includes an annular groove (74) for receiving said respective tongue (72).

16. An assembly as set forth in claim 15 further including an elastomeric seal (76) disposed in said annular groove (74) of each of said right clamp halves (64).

17. An assembly as set forth in claim 13 further including a first stop face disposed in said casing (12) adjacent said first end of said upper race (32) and having a core element passage therethrough.

18. An assembly as set forth in claim 17 further including a second stop face (46) disposed in said casing (12) adjacent said second end (36) of said lower race (32') and having a core element passage (48) therethrough.

19. An assembly as set forth in claim 18 wherein said first (58) and second (60) clamps each have auxiliary tie wire openings (78).

20. An assembly as set forth in claim 13 wherein said core element (20) has a generally rectangular cross section.

21. An assembly as set forth in claim 20 wherein said roller means (24) includes a plurality of rollers (26) retained in an upper cage (28) and a lower cage (30).

22. An assembly as set forth in claim 21 wherein said rollers (26) are spherical.

* * * * *